(12) United States Patent
Wang et al.

(10) Patent No.: US 11,381,812 B2
(45) Date of Patent: Jul. 5, 2022

(54) BOUNDARY FILTERING METHOD FOR INTRA PREDICTION

(71) Applicant: PEKING UNIVERSITY SHENZHEN GRADUATE SCHOOL, Shenzhen (CN)

(72) Inventors: Ronggang Wang, Shenzhen (CN); Kui Fan, Shenzhen (CN); Ge Li, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 154 days.

(21) Appl. No.: 16/755,350

(22) PCT Filed: Sep. 25, 2018

(86) PCT No.: PCT/CN2018/107209
§ 371 (c)(1),
(2) Date: Apr. 10, 2020

(87) PCT Pub. No.: WO2019/091235
PCT Pub. Date: May 16, 2019

(65) Prior Publication Data
US 2020/0314418 A1 Oct. 1, 2020

(30) Foreign Application Priority Data
Nov. 9, 2017 (CN) .......................... 201711095964.9

(51) Int. Cl.
*H04N 19/11* (2014.01)
*H04N 19/117* (2014.01)
(Continued)

(52) U.S. Cl.
CPC ........... *H04N 19/11* (2014.11); *H04N 19/117* (2014.11); *H04N 19/147* (2014.11);
(Continued)

(58) Field of Classification Search
None
See application file for complete search history.

(56) References Cited

U.S. PATENT DOCUMENTS

| 2012/0140821 A1 | 6/2012 | Drugeon et al. |
| 2016/0198189 A1 | 7/2016 | Lee et al. |

(Continued)

FOREIGN PATENT DOCUMENTS

| CN | 103404151 A | 11/2013 |
| CN | 107801024 A | 3/2018 |
| WO | 2017065357 A1 | 4/2017 |

OTHER PUBLICATIONS

Fan, Kui et al., "Improved Intra Boundary Filters for HEVC", 2017 IEEE Visual Communications and Image Processing (VCIP), Dec. 13, 2017 (Dec. 13, 2017).

(Continued)

*Primary Examiner* — Kaitlin A Retallick
(74) *Attorney, Agent, or Firm* — Miles & Stockbridge P.C.

(57) ABSTRACT

Disclosed is a boundary filtering method for intra prediction, relating to the video encoding technology filed. Whether boundary filtering is performed on an intra prediction block or not is adaptively selected by means of a rate distortion optimization decision; during filtering, a filter coefficient exponentially attenuated relative to distance to boundary is adopted to perform filtering on the first N rows or the first N columns of the intra prediction block by means of an intra prediction block filter, and different filtering strengths are used according to different sizes of the prediction blocks. Therefore, the boundary distortion problem of intra prediction block is solved, the intra prediction precision is improved, and the encoding efficiency of intra prediction (Continued)

block is increased; and the practicability and the robustness of the boundary filtering technology are improved.

9 Claims, 4 Drawing Sheets

(51) Int. Cl.
*H04N 19/147* (2014.01)
*H04N 19/159* (2014.01)
*H04N 19/593* (2014.01)
*H04N 19/82* (2014.01)

(52) U.S. Cl.
CPC ......... *H04N 19/159* (2014.11); *H04N 19/593* (2014.11); *H04N 19/82* (2014.11)

(56) References Cited

U.S. PATENT DOCUMENTS

2018/0309987 A1* 10/2018 Kim .................. H04N 19/105
2018/0376137 A1* 12/2018 Jun .................... H04N 19/119

OTHER PUBLICATIONS

Qualcomm Incorporated., "Further Improvements to HMKTA-1.0", ITU-Telecommunications Standardization Sector Study Group 16 Question 6 Video Coding Experts Group (VCEG) 52nd Meeting: VCEG-AZ07, Jun. 26, 2015 (Jun. 26, 2015).

* cited by examiner

BOUNDARY FILTERING METHOD FOR INTRA PREDICTION

CROSS-REFERENCE TO RELATED APPLICATIONS

This application is a national stage filing under 35 U.S.C. § 371 of PCT/CN2018/107209, filed on Sep. 25, 2018 which claims priority to CN Application No. 201711095964.9 filed on Nov. 9, 2017. The applications are incorporated herein by reference in their entirety.

FIELD

The present disclosure relates to the video encoding technology field, and more particularly relates to a boundary filtering method for intra prediction.

BACKGROUND

Intra filtering is a very effective coding tool, which is used to optimize the boundary of the intra prediction block, and can effectively alleviate the distortion at the boundary of the intra prediction block.

In the high efficiency video coding (HEVC) standard, two kinds of boundary filtering for intra prediction are used.

One is to use a two tap filter (filter coefficient is [1/43/4]) to filter the first row and the first column of the intra prediction block for the DC (Direct Current) prediction mode; the other is to filter the first row of the horizontal prediction mode and the first column of the vertical prediction modes for the horizontal and vertical prediction modes.

The main defects of the above filtering technology include the following aspects:

(1) the above existing filtering technology is only for a few intra prediction modes, so the performance of the intra filtering technology is limited to a certain extent;

(2) these filtering techniques do not consider the spatial correlation between pixels in detail;

(3) the use of these filtering techniques lacks decision-making process, which reduces the practicability of these filtering techniques.

SUMMARY

To overcome the drawbacks the prior art, the present provides a boundary filtering method for intra prediction, which can effectively solve the problem of boundary distortion of intra prediction block, improve the intra prediction precision, and increase the coding efficiency of the intra prediction block.

The technical solution provided by the present invention is as follows: a boundary filtering method for intra prediction, whether boundary filtering is performed on an intra prediction block or not is adaptively selected by means of a rate distortion optimization (RDO) decision. The boundary filtering method filters the first N rows or the first N columns of the intra prediction block by means of an intra prediction block filter. During filtering, a filter coefficient exponentially attenuated relative to distance to boundary is adopted to perform filtering; and different filtering strengths are used according to different sizes of the prediction blocks. The boundary filtering method can effectively solve the problem of boundary distortion of intra prediction block, improve the intra prediction precision, and increase the coding efficiency of the intra prediction block, which comprising:

1) at the encoding side, performing rate distortion optimization on each coding unit; comprising:

11) performing intra prediction block filtering for each coding unit;

12) determining whether intra prediction block boundary filtering should be used at the encoding side by means of a RDO decision; transmitting a flag to the bitstream to identify whether intra prediction block boundary filtering is used for intra prediction;

13) when intra prediction block boundary filtering should be used at the encoding side, intra boundary filtering coding is performed by the intra prediction block filter, which including the following processes:

first, obtaining reference pixels adjacent to the current block from the reconstructed prediction blocks;

subsequently, intra prediction is performed according to the prediction direction of the intra prediction block to obtain an intra prediction value;

finally, the reference pixels for boundary filtering are selected according to the prediction mode of the current intra prediction block, and filter coefficients are selected according to the size of the prediction block; the current prediction value is subjected to boundary filtering using the reference pixels to obtain a new intra prediction value;

2) at the decoding side, reading the flag in the bitstream for each coding unit and decoding according to the flag, which including the following processes:

21) determining whether intra prediction block boundary filtering should be used at the decoding side;

22) when intra prediction block boundary should be used at the decoding side, intra boundary filtering decoding is performed by the intra prediction block filter, which including the following processes:

first, obtaining reference pixels adjacent to the current block from the reconstructed prediction blocks;

then, intra prediction is performed to obtain the intra prediction value according to the prediction mode of the intra prediction block that is obtained by decoding;

finally, reference pixels for boundary filtering are selected according to the prediction mode of the current intra prediction block, and filter coefficients are selected according to the size of the prediction block, and the current prediction value is filtered using the reference pixels to obtain a new intra prediction value.

The core of the present disclosure is to filter the pixel value obtained after intra prediction, including processing the encoding end and the decoding end.

Specifically, at the coding end, when performing rate distortion optimization (RDO) for each coding unit (Cu), it is necessary to try to perform intra prediction block filtering, and decide whether to use the intra prediction block filtering method proposed by the present finally by means of RDO. Each coding unit needs to transmit a flag with 1-bit to the bitstream to identify whether the intra prediction uses the intra prediction block filtering method. At the decoding end, the flag with 1-bit in the bitstream is read. According to the meaning of the flag, the decoding end decides whether to use intra prediction block filtering or not.

In this method, the first N rows or first N columns of the intra prediction block are filtered, wherein, the value of N is related to the filtering coefficient. Because the filter coefficient exponentially attenuated relative to distance to boundary is adopted in the present, N is the position when the filter coefficient attenuates to 0. For example, if the filter attenuates to 0 on line n, then the value of N is n. The intra prediction block filtering provided by the present can filter at most the first 10 rows or the first 10 columns of the intra prediction block.

The intra prediction block filter provided by the present invention is a three-tap filter, which is expression as formula 1:

$$P'(x,y)=w_{left}(x) \cdot P(-1,y)+w_{top}(y) \cdot P(x,-1)+(1-w_{left}(x)-w_{top}(y)) \cdot P(x,y)$$

$$0 \leq x,y < N \quad \text{(formula 1)}$$

for a prediction pixel, two reference pixels, pixel P(−1,y) in the same row thereof and pixel P(x,−1) in the same column thereof, are used for filtering, wherein, $w_{left}(x)$ and $w_{top}(y)$ are the boundary filtering coefficients of the two reference pixels respectively, P(x,y) is the predicted pixel after the intra prediction; P'(x,y) is the pixel after the intra prediction block filtering; x, y are the coordinates within the prediction block, it is the first column in the prediction block when x=0, it is the first row in the prediction block when y=0; n is the number of rows or columns. $w_{left}(x)$ and $w_{top}(y)$ attenuate as the distance from the reference pixel increases.

In particular, when $w_{top}(y)$ attenuates to 0, the intra prediction block filter degenerates into a two-tap filter, as shown in formula 2. When $w_{left}(y)$ attenuates to 0, the intra prediction block filter degenerates into a two-tap filter, as shown in formula 3.

$$P'(x,y)=w_{left}(x) \cdot P(-1,y)+(1-w_{left}(x)) \cdot P(x,y), x<N \quad \text{(formula 2)}$$

$$P'(x,y)=w_{top}(y) \cdot P(x,-1)+(1-w_{top}(y)) \cdot P(x,y), y<N \quad \text{(formula 3)}$$

The filter coefficient exponentially attenuated relative to distance to boundary is used for filtering in the intra prediction block filter provided by the present invention, wherein the filter coefficients are expressed in formula 4 and formula 5 respectively:

$$w_{top} = \frac{n_{top}}{2^y} \quad \text{(formula 4)}$$

$$w_{left} = \frac{n_{left}}{2^x} \quad \text{(formula 5)}$$

Where, $n_{top}$ and $n_{left}$ are filter coefficients used for filtering with the first row and the first column of the prediction block, respectively. The filter coefficient with exponential attenuation can p better filtering effect and minimize prediction distortion.

Different filtering strengths are used according to different sizes of the intra prediction blocks in the present invention, wherein the filter intensity parameters $n_{top}$ and $n_{left}$ are obtained according to the prediction distortion training of the intra prediction block.

For the intra prediction value with large prediction distortion, a larger filter coefficient is selected for filtering; for the intra prediction value with small prediction distortion, a smaller filter coefficient is used for filtering. The setting of the filter coefficient is described in the specific embodiment.

Compared with the prior art, the advantages of the present invention are as follows:

The present provides a boundary filtering method for intra prediction, which can effectively solve the problem of boundary distortion of intra prediction block, improve the intra prediction precision, and increase the coding efficiency of the intra prediction block.

In particular, the technical advantages of the present are embodied in the following aspects:

The present determines whether to use intra prediction block boundary filtering with RDO decision, which is equivalent to adaptive selection of whether to carry out boundary filtering on the intra prediction block. Because not every prediction block is suitable for boundary filtering, the practicability and robustness of boundary filtering technology are increased with RDO decision.

Moreover, the boundary filter proposed in the invention can modify more rows or columns (up to 10 rows or columns, while in the prior art, it only filters 4 rows or columns of the boundary at most), which greatly enhances the influence range of the boundary filter and improves the effectiveness of the intra prediction boundary filter.

In addition, the filter coefficient exponentially attenuated relative to distance to boundary is proposed, which is more consistent with the spatial correlation between pixel values. And according to different intra prediction modes and prediction block sizes, different filter coefficients can be selected to get better filtering effect.

In the diagram, abscissa represents different prediction modes; ordinate represents the magnitude of edge distortion of prediction block; the line connecting blocks represents the distortion of the first row at the top of prediction block; the line connecting triangles represents the distortion of the first column on the left of prediction block.

Figure 5:
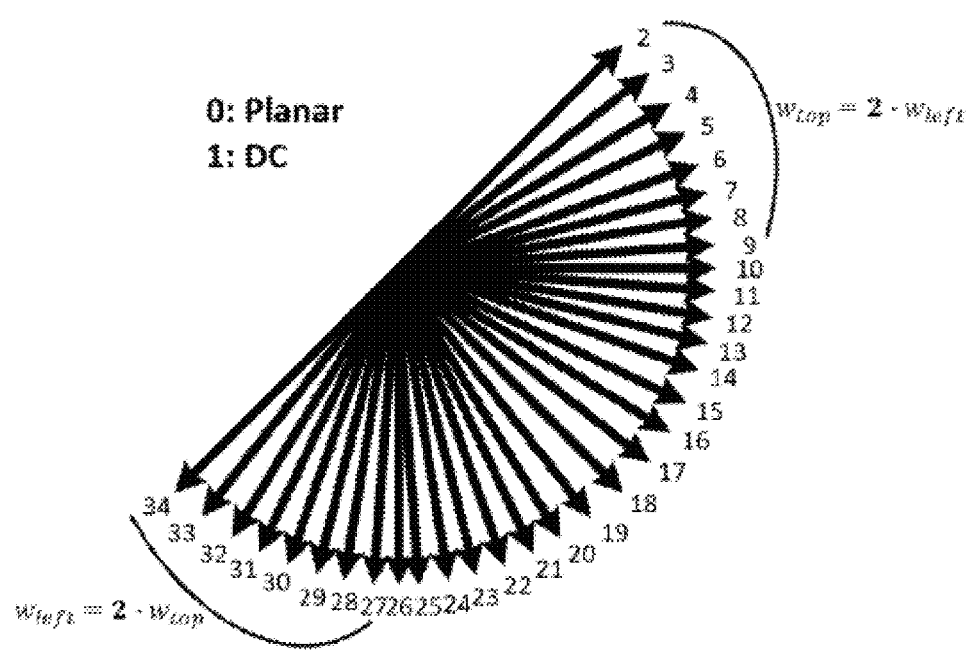

FIG. 5 shows the schematic diagram of the intra prediction boundary filter coefficient in HEVC.

DETAILED DESCRIPTION OF EMBODIMENTS

The present invention will be further described by embodiments in combination with the drawings, but the scope of the present invention will not be limited in any way.

The present invention provides an effective intra prediction filtering method, whether boundary filtering is performed on an intra prediction block or not is adaptively selected by the decision of RDO; the intra prediction block filtering proposed by the present invention filters the first N rows or the first N columns of the intra prediction block, and the value of N is related with the filtering coefficient. Because the filter coefficient exponentially attenuated relative to distance to boundary is adopted in the present, N is the position when the filter coefficient attenuates to 0. For example, if the filter attenuates to 0 on line n, then the value of N is n. The intra prediction block filtering provided by the present can filter at most the first 10 rows or the first 10 columns of the intra prediction block; coefficient with attenuated relative boundary distance exponent is adopted to perform filtering on; and different filtering strengths are used according to different sizes of the prediction blocks. The boundary filtering method can effectively solve the problem of boundary distortion of intra prediction block, improve the intra prediction precision, and increase the coding efficiency of the intra prediction block.

Figure 1:
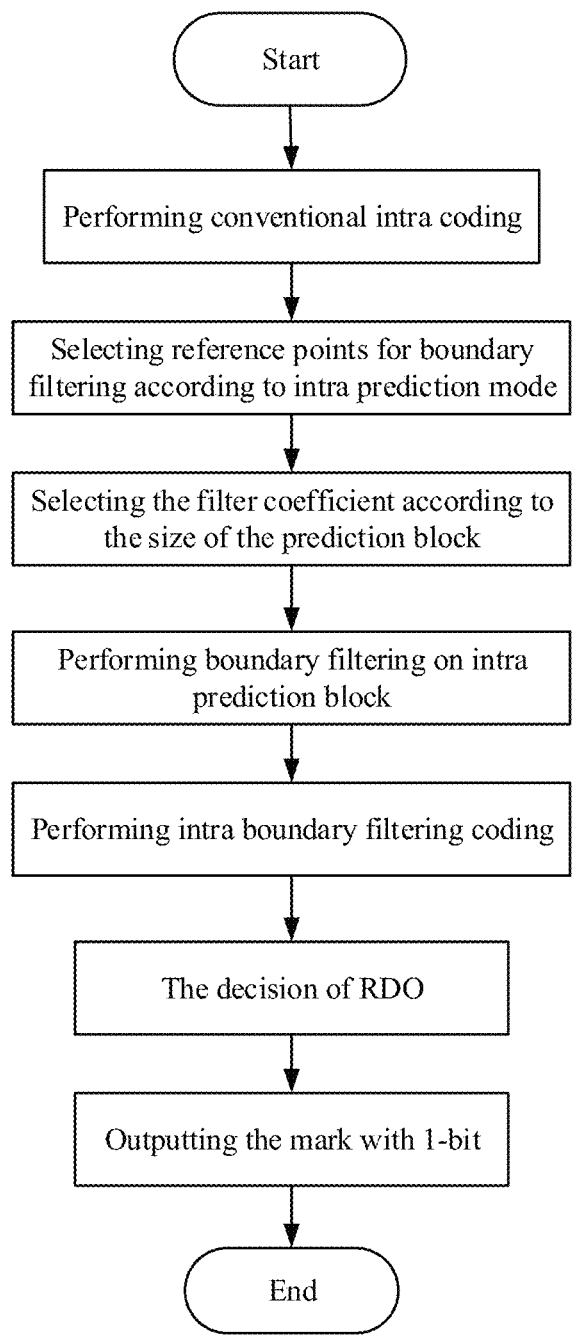
FIG. 1 shows the coding flow diagram of the coding unit (Cu) in the invention.

FIG. 1 shows the coding flow diagram of the coding unit (Cu) in the invention. For an intra coding unit, the conventional intra coding (that is, the intra frame coding algorithm currently used by the existing encoder) is carried out firstly, and then the intra boundary filtering coding (that is, the coding method including the intra prediction block boundary filtering technology) proposed by the present invention is used, that is, after the conventional intra prediction, the boundary of the intra prediction block is filtered by the boundary filter. Then, RDO (rate distortion optimization) is used to choose whether to use intra prediction boundary filtering, and a flag with 1-bit is output to the bitstream.

Figure 2:
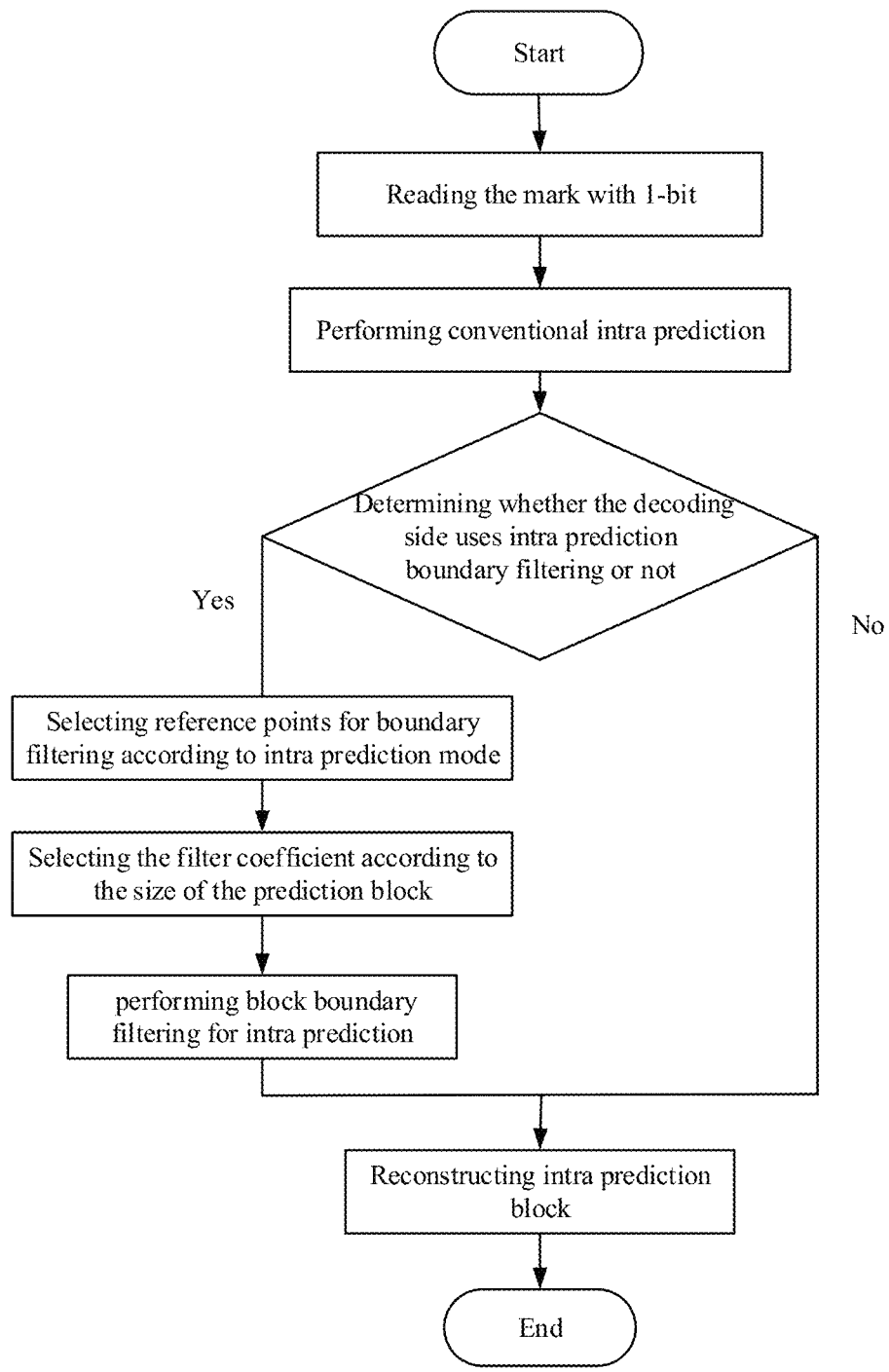
FIG. 2 shows the decoding flow diagram of the coding unit (Cu) in the invention.

FIG. 2 shows the decoding flow diagram of the coding unit (Cu) in the invention. For an intra coding unit, the flag with 1-bit is read firstly, and then the conventional intra prediction is performed. Then determining whether the decoding side uses intra prediction boundary filtering or not according to the value of the flag. If there is no need for boundary filtering, the reconstruction of the intra prediction block can be done directly; otherwise, the reference pixels used for boundary filtering should be selected according to the prediction mode of the current intra prediction block, and the filtering coefficient should be selected according to the size of the prediction block, and the current prediction value should be filtered using the reference pixels to obtain a new intra prediction value. Then the intra prediction block is reconstructed.

In order to avoid floating-point calculation, the boundary filter proposed in the present invention can use the filtering method shown in formula 6, 7 and 8.

$$P'(x,y)=(w_{left}(x) \cdot P(-1,y)+w_{top}(y) \cdot P(x,-1)+(64-w_{left}(x)-w_{top}(y)) \cdot P(x,y)+32)>>6 \quad \text{(formula 6)}$$

$$P'(x,y)=(w_{left}(x) \cdot P(-1,y)+(64-w_{left}(x)) \cdot P(x,y)+32)>>6 \quad \text{(formula 7)}$$

$$P'(x,y)=(w_{top}(y) \cdot P(x,-1)+(64-w_{top}(y)) \cdot P(x,y)+32)>>6 \quad \text{(formula 8)}.$$

That is, the filter coefficients of floating point are converted to integers and the right shift operation is carried out after filtering.

Figure 3:
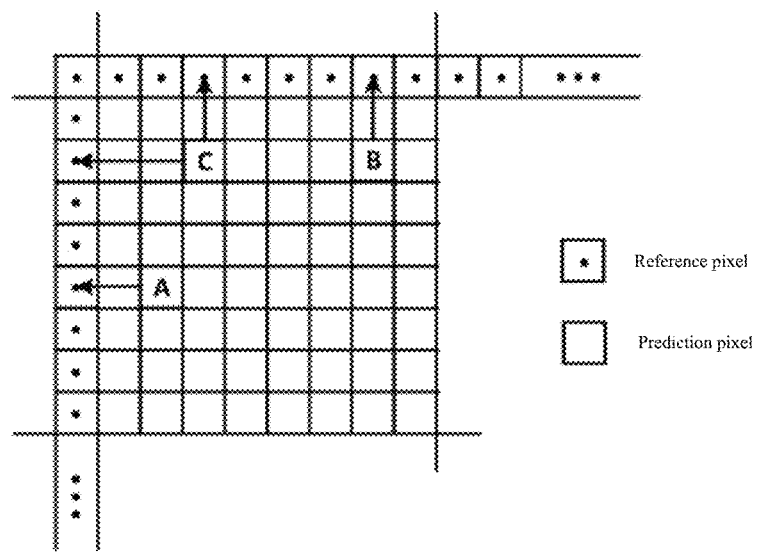
FIG. 3 shows a schematic diagram of boundary filter reference pixel selection in the specific implementation of the invention.

The intra prediction block filter of the present invention uses one or two reference pixels closest to the prediction pixels for filtering. As shown in FIG. 3, the position pointed by the arrow is the reference pixel used for filtering the predicted pixels A, B and C. It is using the reference pixel corresponding to its left side for filtering the pixel A, it is using the reference pixel on its upper side for filtering, and the pixel C is located in the upper and left corner area of the prediction block, so the reference pixels on its upper side and left side are used for filtering it at the same time.

Figure 4:
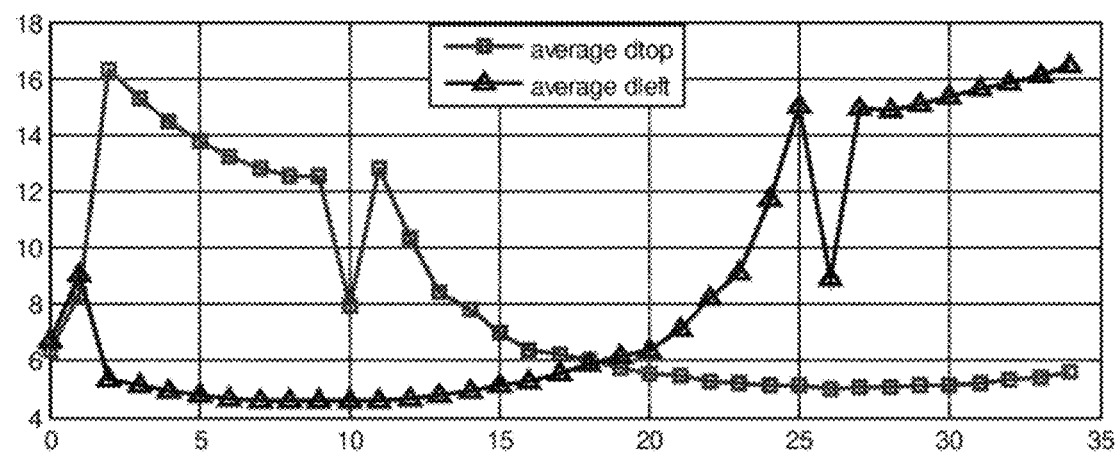
FIG. 4 shows the distribution diagram of edge prediction distortion for each prediction mode of 16×16 prediction block in HEVC.

The intra prediction block filter of the invention adopts a filter coefficient exponentially attenuated relative to distance to boundary. The filter intensity parameters, $n_{top}$ and $n_{left}$, are obtained according to the prediction distortion statistics of the intra prediction block. FIG. 4 illustrates a distribution diagram of prediction distortion for 16×16 intra prediction block statistics in HEVC. The filtering intensity parameters $n_{top}$ and $n_{left}$ are defined to be proportional to the magnitude of prediction distortion, which are expressed as formula 9 and 10:

$$n_{top} = \min\left(\frac{d_{top}}{16}, 1\right) \quad \text{(formula 9)}$$

$$n_{left} = \min\left(\frac{d_{left}}{16}, 1\right) \quad \text{(formula 10)}$$

Wherein, $d_{top}$ is the average prediction distortion value of the first row at the top of the prediction block, and $d_{left}$ is the average prediction distortion value of the first column on the left of the prediction block, "min" means take the minimum value of two values. It can be seen that the maximum value of $n_{top}$ or $n_{left}$ is 1.

For the prediction mode of specific direction, the filter coefficients need to be changed. Taking tue intra prediction mode of HEVC in FIG. 5 as an example, in modes 2-9, when filtering the columns on the left side of the intra prediction block, the filtering coefficient is reduced to half of the original coefficient, and the value of $w_{left}$ becomes half of the value of $w_{top}$; similarly, in modes 27-34, when filtering the rows on the top of the intra prediction block, the filtering coefficient $w_{top}$ is reduced to half of the original.

It should be noted that the purpose of the disclosure of the embodiments is to help further understand the present invention, but those skilled in the art can understand that various substitutions and modifications are possible without departing from the spirit and scope of the invention and the appended claims. Therefore, the present invention shall not be limited to the contents disclosed in the embodiments, and the scope of the present invention to be protected shall be subject to the scope defined in the claims.

We claim:

1. A boundary filtering method for intra prediction, whether boundary filtering is performed on an intra prediction block or not is adaptively selected by means of a rate distortion optimization decision; during filtering, a filter coefficient exponentially attenuated relative to distance to boundary is adopted to perform filtering on the first N rows or the first N columns of the intra prediction block by means of an intra prediction block filter, and different filtering strengths are used according to different sizes of the prediction blocks, comprising:

1) at the encoding side, performing rate distortion optimization on each coding unit; comprising:
      11) performing intra prediction block filtering for each coding unit;
      12) determining whether intra prediction block boundary filtering should be used at the encoding side by means of a rate distortion optimization decision; transmitting a flag to the bitstream to identify whether intra prediction block boundary filtering is used for intra prediction;
      13) when intra prediction block boundary filtering should be used at the encoding side, intra boundary filtering coding is performed by the intra prediction block filter, which including the following processes:
      first, obtaining reference pixels adjacent to the current block from the reconstructed prediction blocks;
      subsequently, intra prediction is performed according to the prediction direction of the intra prediction block to obtain an intra prediction value;
      finally, reference pixels for boundary filtering are selected according to the prediction mode of the current intra prediction block, and filter coefficients are selected according to the size of the prediction block; the current prediction value is subjected to boundary filtering using the reference pixels to obtain a new intra prediction value;
   2) at the decoding side, reading the flag in the bitstream for each coding unit and decoding according to the flag, which including the following processes:
      21) determining whether intra prediction block boundary filtering should be used at the decoding side;

22) when intra prediction block boundary should be used at the decoding side, intra boundary filtering decoding is performed by the intra prediction block filter, which including the following processes:

first, obtaining reference pixels adjacent to the current block from the reconstructed prediction blocks;

then, intra prediction is performed to obtain the intra prediction value according to the prediction mode of the intra prediction block that is obtained by decoding;

finally, reference pixels for boundary filtering are selected according to the prediction mode of the current intra prediction block, and filter coefficients are selected according to the size of the prediction block, and the current prediction value is filtered using the reference pixels to obtain a new intra prediction value;

wherein the value of N is determined by the characteristics of different intra prediction modes and intra prediction blocks of different sizes.

2. The method according to claim 1, characterized in that the flag of the bitstream to identify whether intra prediction block boundary filtering is used for intra prediction is 1-bit.

3. The method according to claim 1, characterized in that the filtering is performed on the first 10 rows or the first 10 columns of the intra prediction block at most.

4. A boundary filtering method for intra prediction, whether boundary filtering is performed on an intra prediction block or not is adaptively selected by means of a rate distortion optimization decision; during filtering, a filter coefficient exponentially attenuated relative to distance to boundary is adopted to perform filtering on the first N rows or the first N columns of the intra prediction block by means of an intra prediction block filter, and different filtering strengths are used according to different sizes of the prediction blocks, comprising:

1) at the encoding side, performing rate-distortion optimization on each coding unit; comprising:

11) performing intra prediction block filtering for each coding unit;

12) determining whether intra prediction block boundary filtering should be used at the encoding side by means of a rate distortion optimization decision; transmitting a flag to the bitstream to identify whether intra prediction block boundary filtering is used for intra prediction;

13) when intra prediction block boundary filtering should be used at the encoding side, intra boundary filtering coding is performed by the intra prediction block filter, which including the following processes:

first, obtaining reference pixels adjacent to the current block from the reconstructed prediction blocks;

subsequently, intra prediction is performed according to the prediction direction of the intra prediction block to obtain an intra prediction value;

finally, reference pixels for boundary filtering are selected according to the prediction mode of the current intra prediction block, and filter coefficients are selected according to the size of the prediction block; the current prediction value is subjected to boundary filtering using the reference pixels to obtain a new intra prediction value;

2) at the decoding side, reading the flag in the bitstream for each coding unit and decoding according to the flag, which including the following processes:

21) determining whether intra prediction block boundary filtering should be used at the decoding side;

22) when intra prediction block boundary should be used at the decoding side, intra boundary filtering decoding is performed by the intra prediction block filter, which including the following processes:

first, obtaining reference pixels adjacent to the current block from the reconstructed prediction blocks;

then, intra prediction is performed to obtain the intra prediction value according to the prediction mode of the intra prediction block that is obtained by decoding;

finally, reference pixels for boundary filtering are selected according to the prediction mode of the current intra prediction block, and filter coefficients are selected according to the size of the prediction block, and the current prediction value is filtered using the reference pixels to obtain a new intra prediction value;

wherein the value of N is determined by the characteristics of different intra prediction modes and intra prediction blocks of different sizes;

wherein the intra prediction block filter is a three-tap filter, which is expression as formula 1:

$$P'(x,y)=w_{left}(x) \cdot P(-1,y)+w_{top}(y) \cdot P(x,-1)+(1-w_{left}(x)-w_{top}(y)) \cdot P(x,y)$$

$$0 \leq x,y < N \quad \text{(formula 1)}$$

for a prediction pixel, two reference pixels, pixel $P(-1,y)$ in the same row thereof and pixel $P(x,-1)$ in the same column thereof, are used for filtering, wherein, $w_{left}(x)$ and $w_{top}(y)$ are the boundary filtering coefficients of the two reference pixels respectively, $P(x,y)$ is the predicted pixel after the intra prediction; $P'(x,y)$ is the pixel after the intra prediction block filtering; x, y are the coordinates within the prediction block, it is the first column in the prediction block when x=0, it is the first row in the prediction block when y=0; n is the number of rows or columns.

5. The method according to claim 4, characterized in that for the intra prediction block filter, when $w_{top}(y)$ attenuates to 0, the intra prediction block filter degenerates into a two-tap filter, as shown in formula 2:

$$P'(x,y)=w_{left}(x) \cdot P(-1,y)+(1-w_{left}(x)) \cdot P(x,y), x<N \quad \text{(formula 2)}$$

$$P'(x,y)=w_{top}(y) \cdot P(x,-1)+(1-w_{top}(y)) \cdot P(x,y), y<N \quad \text{(formula 3)}$$

when $w_{left}(y)$ attenuates to 0, the intra prediction block filter degenerates into a two-tap filter, as shown in formula 3.

6. A boundary filtering method for intra prediction, whether boundary filtering is performed on an intra prediction block or not is adaptively selected by means of a rate distortion optimization decision; during filtering, a filter coefficient exponentially attenuated relative to distance to boundary is adopted to perform filtering on the first N rows or the first N columns of the intra prediction block by means of an intra prediction block filter, and different filtering strengths are used according to different sizes of the prediction blocks, comprising:

1) at the encoding side, performing rate-distortion optimization on each coding unit; comprising:

11) performing intra prediction block filtering for each coding unit;

12) determining whether intra prediction block boundary filtering should be used at the encoding side by means of a rate distortion optimization decision; transmitting a flag to the bitstream to identify whether intra prediction block boundary filtering is used for intra prediction;

13) when intra prediction block boundary filtering should be used at the encoding side, intra boundary filtering coding is performed by the intra prediction block filter, which including the following processes:

first, obtaining reference pixels adjacent to the current block from the reconstructed prediction blocks;

subsequently, intra prediction is performed according to the prediction direction of the intra prediction block to obtain an intra prediction value;

finally, reference pixels for boundary filtering are selected according to the prediction mode of the current intra prediction block, and filter coefficients are selected according to the size of the prediction block; the current prediction value is subjected to boundary filtering using the reference pixels to obtain a new intra prediction value;

2) at the decoding side, reading the flag in the bitstream for each coding unit and decoding according to the flag, which including the following processes:

21) determining whether intra prediction block boundary filtering should be used at the decoding side;

22) when intra prediction block boundary should be used at the decoding side, intra boundary filtering decoding is performed by the intra prediction block filter, which including the following processes:

first, obtaining reference pixels adjacent to the current block from the reconstructed prediction blocks;

then, intra prediction is performed to obtain the intra prediction value according to the prediction mode of the intra prediction block that is obtained by decoding;

finally, reference pixels for boundary filtering are selected according to the prediction mode of the current intra prediction block, and filter coefficients are selected according to the size of the prediction block, and the current prediction value is filtered using the reference pixels to obtain a new intra prediction value;

wherein the filter coefficient exponentially attenuated relative to distance to boundary is used for filtering, wherein the filter coefficients are expressed in formula 4 and formula 5 respectively:

$$w_{top} = \frac{n_{top}}{2^y} \quad \text{(formula 4)}$$

$$w_{left} = \frac{n_{left}}{2^x} \quad \text{(formula 5)}$$

where, $n_{top}$ and $n_{left}$ are filter coefficients used for filtering with the first row and the first column of the prediction block, respectively.

7. A boundary filtering method for intra prediction, whether boundary filtering is performed on an intra prediction block or not is adaptively selected by means of a rate distortion optimization decision; during filtering, a filter coefficient exponentially attenuated relative to distance to boundary is adopted to perform filtering on the first N rows or the first N columns of the intra prediction block by means of an intra prediction block filter, and different filtering strengths are used according to different sizes of the prediction blocks, comprising:

1) at the encoding side, performing rate-distortion optimization on each coding unit; comprising:

11) performing intra prediction block filtering for each coding unit;

12) determining whether intra prediction block boundary filtering should be used at the encoding side by means of a rate distortion optimization decision; transmitting a flag to the bitstream to identify whether intra prediction block boundary filtering is used for intra prediction;

13) when intra prediction block boundary filtering should be used at the encoding side, intra boundary filtering coding is performed by the intra prediction block filter, which including the following processes:

first, obtaining reference pixels adjacent to the current block from the reconstructed prediction blocks;

subsequently, intra prediction is performed according to the prediction direction of the intra prediction block to obtain an intra prediction value;

finally, reference pixels for boundary filtering are selected according to the prediction mode of the current intra prediction block, and filter coefficients are selected according to the size of the prediction block; the current prediction value is subjected to boundary filtering using the reference pixels to obtain a new intra prediction value;

2) at the decoding side, reading the flag in the bitstream for each coding unit and decoding according to the flag, which including the following processes:

21) determining whether intra prediction block boundary filtering should be used at the decoding side;

22) when intra prediction block boundary should be used at the decoding side, intra boundary filtering decoding is performed by the intra prediction block filter, which including the following processes:

first, obtaining reference pixels adjacent to the current block from the reconstructed prediction blocks;

then, intra prediction is performed to obtain the intra prediction value according to the prediction mode of the intra prediction block that is obtained by decoding;

finally, reference pixels for boundary filtering are selected according to the prediction mode of the current intra prediction block, and filter coefficients are selected according to the size of the prediction block, and the current prediction value is filtered using the reference pixels to obtain a new intra prediction value;

wherein the filter coefficients of floating point are converted to integers by using the filtering method shown in formula 6, 7 and 8, and the right shift operation is carried out after filtering to avoid floating point calculation:

$$P'(x,y)=(w_{left}(x)\cdot P(-1,y)+w_{top}(y)\cdot P(x,-1)+(64-w_{left}(x)-w_{top}(y))\cdot P(x,y)+32)>>6 \quad \text{(formula 6)}$$

$$P'(x,y)=(w_{left}(x)\cdot P(-1,y)+(64-w_{left}(x))\cdot P(x,y)+32)>>6 \quad \text{(formula 7)}$$

$$P'(x,y)=(w_{top}(y)\cdot P(x,-1)+(64-w_{top}(y))\cdot P(x,y)+32)>>6 \quad \text{(formula 8)}.$$

8. A boundary filtering method for intra prediction, whether boundary filtering is performed on an intra prediction block or not is adaptively selected by means of a rate distortion optimization decision; during filtering, a filter coefficient exponentially attenuated relative to distance to boundary is adopted to perform filtering on the first N rows or the first N columns of the intra prediction block by means of an intra prediction block filter, and different filtering strengths are used according to different sizes of the prediction blocks, comprising:

1) at the encoding side, performing rate-distortion optimization on each coding unit; comprising:

11) performing intra prediction block filtering for each coding unit;

12) determining whether intra prediction block boundary filtering should be used at the encoding side by means of a rate distortion optimization decision; transmitting a flag to the bitstream to identify whether intra prediction block boundary filtering is used for intra prediction;

13) when intra prediction block boundary filtering should be used at the encoding side, intra boundary filtering coding is performed by the intra prediction block filter, which including the following processes:

first, obtaining reference pixels adjacent to the current block from the reconstructed prediction blocks;

subsequently, intra prediction is performed according to the prediction direction of the intra prediction block to obtain an intra prediction value;

finally, reference pixels for boundary filtering are selected according to the prediction mode of the current intra prediction block, and filter coefficients are selected according to the size of the prediction block; the current prediction value is subjected to boundary filtering using the reference pixels to obtain a new intra prediction value;

2) at the decoding side, reading the flag in the bitstream for each coding unit and decoding according to the flag, which including the following processes:

21) determining whether intra prediction block boundary filtering should be used at the decoding side;

22) when intra prediction block boundary should be used at the decoding side, intra boundary filtering decoding is performed by the intra prediction block filter, which including the following processes:

first, obtaining reference pixels adjacent to the current block from the reconstructed prediction blocks;

then, intra prediction is performed to obtain the intra prediction value according to the prediction mode of the intra prediction block that is obtained by decoding;

finally, reference pixels for boundary filtering are selected according to the prediction mode of the current intra prediction block, and filter coefficients are selected according to the size of the prediction block, and the current prediction value is filtered using the reference pixels to obtain a new intra prediction value;

wherein different filtering strengths are used according to different sizes of the intra prediction blocks, wherein filter intensity parameters $n_{top}$ and $n_{left}$ are obtained according to a prediction distortion training of the intra prediction block.

9. The method according to claim 8, characterized in that according to the prediction distortion distribution based on the statistics of 16×16 intra prediction block in HEVC, the filtering intensity parameters $n_{top}$ and $n_{left}$ are defined to be proportional to the magnitude of prediction distortion, which are expressed as formula 9 and 10:

$$n_{top} = \min\left(\frac{d_{top}}{16}, 1\right) \quad \text{(formula 9)}$$

$$n_{left} = \min\left(\frac{d_{left}}{16}, 1\right) \quad \text{(formula 10)}$$

wherein, $d_{top}$ is the average prediction distortion value of the first row at the top of the prediction block, and $d_{left}$ is the average prediction distortion value of the first column on the left of the prediction block, "min" means take the minimum value of two values.

* * * * *